(12) United States Patent
Jakeman et al.

(10) Patent No.: US 7,843,175 B2
(45) Date of Patent: Nov. 30, 2010

(54) METHOD AND APPARATUS FOR CONTROLLING EXCITATION

(75) Inventors: Nigel Jakeman, Stamford (GB);
Michael John Wright, Stamford (GB);
Denis Hadley Dalby, Oakham (GB);
Neil Brown, Holbeach (GB)

(73) Assignee: Cummins Generator Technologies Limited, Stamford, Lincolnshire (GB)

( * ) Notice: Subject to any disclaimer, the term of this patent is extended or adjusted under 35 U.S.C. 154(b) by 0 days.

(21) Appl. No.: 12/536,704

(22) Filed: Aug. 6, 2009

(65) Prior Publication Data

US 2010/0007313 A1  Jan. 14, 2010

Related U.S. Application Data

(63) Continuation of application No. PCT/GB2008/000392, filed on Feb. 5, 2008.

(30) Foreign Application Priority Data

Feb. 6, 2007  (GB)  ................. 0702253.6

(51) Int. Cl.
*H02P 9/00* (2006.01)
*H02H 7/06* (2006.01)
(52) U.S. Cl. .................. 322/28; 322/37; 310/179
(58) Field of Classification Search .............. 322/10, 322/22, 23, 27, 28, 37, 59; 310/179, 180
See application file for complete search history.

(56) References Cited

U.S. PATENT DOCUMENTS

| 4,410,848 | A | | 10/1983 | Frierdich |
| 4,467,267 | A | | 8/1984 | Hucker et al. |
| 5,325,042 | A | * | 6/1994 | Murugan ................. 322/10 |
| 5,493,200 | A | * | 2/1996 | Rozman et al. ............ 322/10 |
| 5,493,201 | A | * | 2/1996 | Baker ..................... 322/10 |
| 5,850,138 | A | | 12/1998 | Adams et al. |

(Continued)

FOREIGN PATENT DOCUMENTS

DE  10 2004 062 031 A1  7/2006

(Continued)

OTHER PUBLICATIONS

International Search Report of PCT/GB2008/000392, dated May 27, 2008.

(Continued)

*Primary Examiner*—Nicholas Ponopmarenko
(74) *Attorney, Agent, or Firm*—Hamre, Schumann, Mueller & Larson, P.C.; J. Bruce Schelkopf

(57) ABSTRACT

Excitation control circuitry for a synchronous generator is disclosed. The synchronous generator is of a type comprising a main machine (2) and an exciter (6) for exciting the main machine. The excitation control circuitry comprises an automatic voltage regulator (10) for controlling power flow from the main machine to the exciter, and an excitation boost system (14) for selectively supplying power from a second source of electrical power (12) to the exciter (6). This can allow additional excitation to be provided, for example, when the generator is in overload. This arrangement can allow a synchronous generator to be upgraded by adding the excitation boost system to provide enhanced overload performance.

14 Claims, 8 Drawing Sheets

U.S. PATENT DOCUMENTS

| | | | |
|---|---|---|---|
| 6,998,726 B2 * | 2/2006 | Sarlioglu et al. | 290/31 |
| 7,301,310 B2 * | 11/2007 | Ganev et al. | 322/28 |
| 2010/0039077 A1 * | 2/2010 | Dalby | 322/59 |

FOREIGN PATENT DOCUMENTS

| | | |
|---|---|---|
| EP | 0 122 310 A1 | 10/1984 |
| EP | 0 825 700 A1 | 2/1998 |
| JP | 58-195498 A | 11/1983 |
| JP | 6-178459 A | 6/1994 |
| JP | 7-227100 A | 8/1995 |
| WO | WO 2004/055960 A1 | 7/2004 |

OTHER PUBLICATIONS

Written Opinion of the International Searching Authority of PCT/GB2008/000392, dated May 27, 2008.

United Kingdom Search Report of GB 0702253.6, dated Nov. 6, 2007.

* cited by examiner

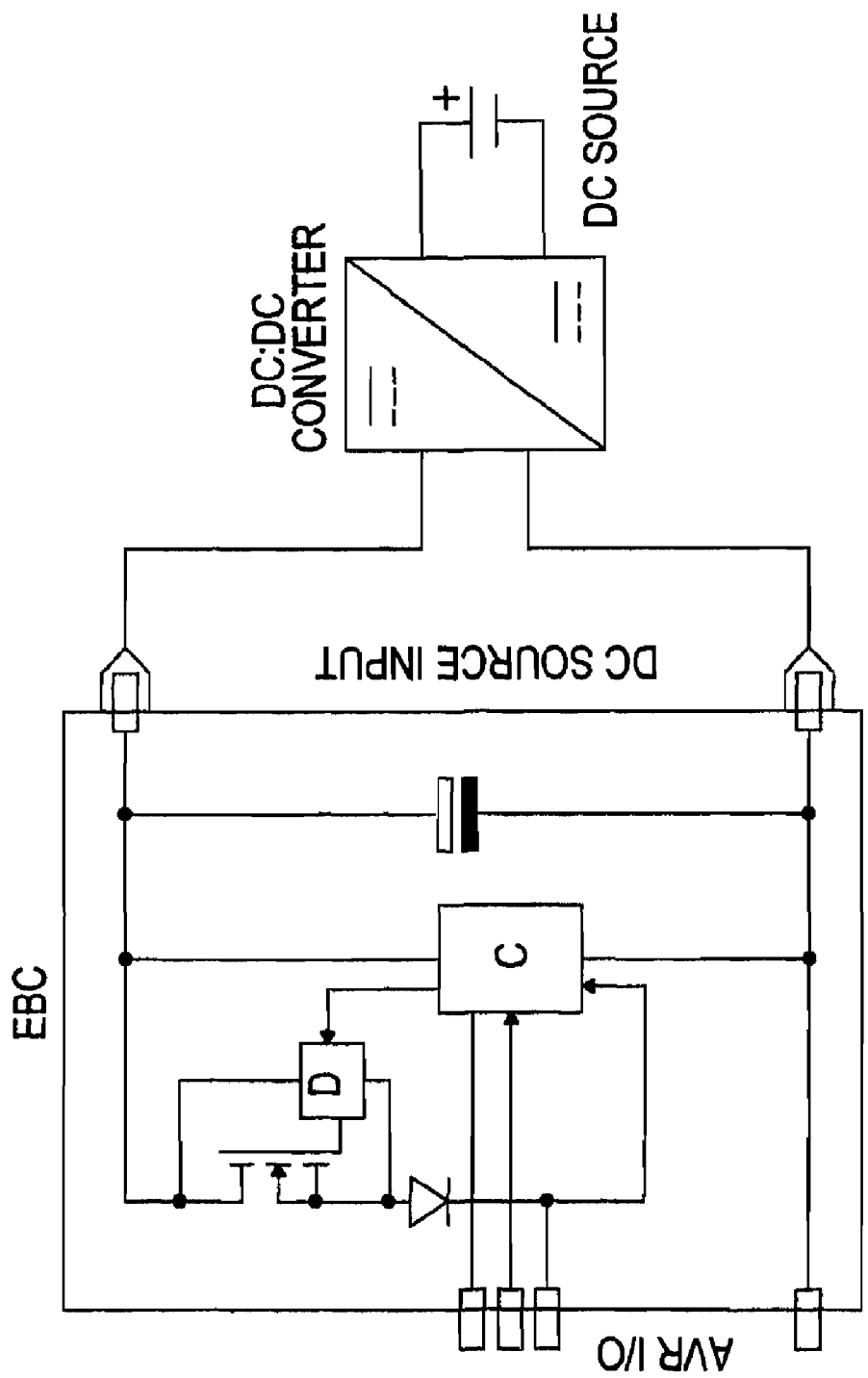

METHOD AND APPARATUS FOR CONTROLLING EXCITATION

The present invention relates to a method of and apparatus for controlling excitation in a synchronous generator.

Synchronous generators operate by rotating a magnetic field produced by a rotor relative to windings in a stator in order to generate an AC output in the stator windings. The rotor's magnetic field may be produced by passing a DC current through windings in the rotor. This DC current may be generated by an exciter mounted on the shaft of the generator. An automatic voltage regulator (AVR) may be provided to control the exciter, and thereby to control the current supplied to the rotor windings.

Synchronous generators normally have a maximum rated load, which is the maximum load that the generator can supply under steady state conditions. In addition, certain applications may require the generator to have short circuit maintenance and/or enhanced overload capability. Applications demanding this include, amongst others, marine applications, mobile light towers and military prime power generating sets.

Traditionally, such requirements have been met by using auxiliary windings embedded in the stator of the main machine or compounding transformers connected in line with the armature windings. A drawback with the auxiliary winding method is that it cannot be up-fit in service or post manufacture. Thus the winding itself has to be embedded in all machines, resulting in higher active material costs. Whilst compounding transformers can be up-fit, to meet the requirements of a range of frame sizes and/or core sizes many variants of compounding transformer would be required, thus proliferating stock requirements at distribution centres. Furthermore, a de-rate to the generator is required, again influencing active material and cost.

Alternatively, a Permanent Magnet Generator (PMG) can be used to excite the generator and to provide an isolated means for meeting short circuit maintenance and overload support requirements. Such a PMG will act as a protected source of excitation power in steady state conditions. Even though a PMG may avoid some of the problems associated with auxiliary windings or compounding transformers, an alternative AVR to that used on a machine without overload capability is required.

It has been estimated that, in low power ranges (<50 kVA), only about 5-10% of applications actually need enhanced overload performance. Therefore it is often necessary to supply base machines which do not have the added expense and complexity of enhanced overload performance. Nonetheless, it would be desirable to be able to upgrade the base machine to provide short circuit and overload performance, whilst keeping the cost of the base machine to a minimum.

According to a first aspect of the present invention there is provided excitation control circuitry for a synchronous generator, the synchronous generator comprising a main machine and an exciter for exciting the main machine, the excitation control circuitry comprising:

an automatic voltage regulator for controlling power flow from the main machine to the exciter; and an excitation boost system for selectively supplying power from a second source of electrical power to the exciter.

By providing an excitation boost system for selectively applying power to the exciter from a second source of electrical power, the present invention may allow additional excitation to be provided, for example, when the generator is in overload. The present invention may also provide the advantage that a synchronous generator can be easily upgraded by adding the excitation boost system to provide enhanced overload performance.

The excitation boost system may be arranged to supply power to the exciter from the second source of electrical power to supplement or to replace that supplied by the main machine during overload. This may enhance the overload performance of the generator.

Preferably the automatic voltage regulator is arranged to control power flow from the main machine during steady state operation. In this way normal generator control may be carried out while the generator is not in an overload condition. Preferably the system is arranged to supply power to the exciter from the second source of electrical power when the generator is at or near to overload. In this way additional excitation power can be provided when the generator is in an overload condition, which may enhance the overload performance of the generator. For example, the excitation boost system may be arranged to supply an increasing amount of power to the exciter from the second source of electrical power as the load on the generator increases during overload conditions. Alternatively, power from the second source may be switched on or off as appropriate.

The excitation boost system may be arranged to receive a control signal from the automatic voltage regulator indicating a load condition of the generator, and to control the supply of power from the second source of electrical power to the exciter in dependence on the control signal. In this way the system may be controlled such that power is only supplied to the exciter from the second source of electrical power when required, for example, when the generator is in an overload condition. Furthermore, this arrangement may allow the amount of power which is supplied to the exciter from the second source of electrical power to be controlled so that, for example, more power is supplied from the second source when the generator is more heavily loaded or in a short circuit condition. This may improve the overload performance of the generator.

Preferably the excitation control system is arranged such that the voltage at the output of the generator during an overload condition is greater than it would be without a contribution from the excitation boost system. Preferably the excitation boost system is arranged to control the power supplied to the exciter from the second source of electrical power such that, during an overload condition, the voltage output of the generator is substantially the same as during normal operation.

The excitation boost system may comprise a controllable switch for selectively supplying power from the second source of electrical power to the generator. The controllable switch may comprise, for example, a transistor, such as a bipolar transistor or a field effect transistor (FET). In this example, if the second source of electrical power is an AC source, the system may further comprise a rectifier for rectifying the AC source. As another example, the controllable switch may comprise one or more thyristors. If the second source of electrical power is an AC source the thyristor or thyristors may be arranged to rectify and to control the AC source.

The excitation boost system may be arranged to be connectable to and removable from the automatic voltage regulator. In this way the excitation boost system may be added to a generator without enhanced overload performance, in order to upgrade the generator.

The output of the automatic voltage regulator and the output of the excitation boost system may be combined and supplied to the same exciter windings. This can allow the excitation boost system to be added to an existing generator without the need for a separate exciter. Preferably the exciter is a single machine driven by the same prime mover as the main machine.

The second source of electrical power is preferably separate from the first source, and may be for example a machine which is driven by the same prime mover as the main machine. For example, the second source of electrical power may be a permanent magnet generator. The permanent magnet generator may be mounted on the same shaft as the main machine, or otherwise arranged to be driven by the same prime mover as the main machine. The permanent magnet generator may be three phase, single phase, or have some other number of phases. Alternatively, the second source of electrical power may be a machine which is driven by a separate prime mover from that which drives the main machine.

In a preferred embodiment of the invention the second source of electrical power is a permanent magnet generator, which may be mounted on the same shaft as the main machine. Since at least some of the power for the exciter may come from the main machine, the permanent magnet generator may have a lower rating than if it were required to provide all of the excitation power, which may reduce the overall size, weight and cost of the generator, while at the same time providing enhanced overload performance. Such an arrangement may also allow a basic generator to be upgraded to provide enhanced overload performance.

In another embodiment, the second source of electrical power is a DC power source. The DC power source may be, for example, a battery, which may be charged by the main machine during normal operation. This arrangement may avoid the need for a separate machine to provide the excitation power, and thus may allow a reduction in the length, size, weight and/or cost of the generator.

In a further embodiment, the second source of electrical power is a capacitor, such as a super capacitor. The capacitor may be charged by the main machine during normal operation, and may be arranged to discharge during overload conditions to provide a temporary additional source of excitation power.

In any of the above arrangements, the excitation boost system may comprise the second source of electrical power, or the second source of electrical power may be part of some other system.

If desired, the excitation boost system may be arranged selectively to apply power to the exciter from two or more sources of electrical power, in addition to the first source. For example, the system may be arranged selectively to apply power to the exciter from both a permanent magnet generator and a battery, or any other combination of power sources.

The invention extends to a synchronous generator comprising a main machine, an exciter for exciting the main machine, and excitation control circuitry in any of the forms described above.

According to another aspect of the invention there is provided a method of exciting a synchronous generator, the synchronous generator comprising a main machine and an exciter for exciting the main machine, the method comprising controlling power flow from the main machine to the exciter, and selectively applying power to the exciter from a second source of electrical power.

Any of the apparatus features may be provided as method features and vice versa.

Preferred features of the present invention will now be described, purely by way of example, with reference to the accompanying drawings, in which:

FIG. 10 shows another embodiment of an excitation boost system.

Figure 1:
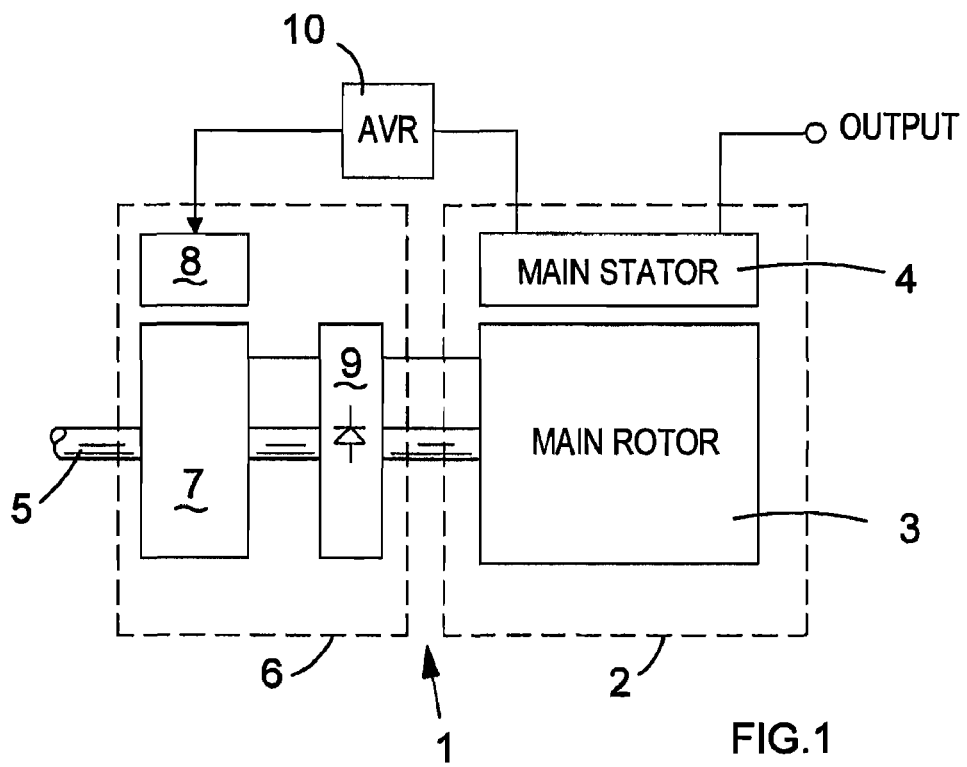
FIG. 1 shows parts of a synchronous generator.

FIG. 1 shows parts of a synchronous generator 1. The generator includes a main machine 2 comprising a main rotor 3 and a main stator 4. The main rotor 3 is located on a shaft 5 which is driven by a prime mover such as a diesel engine (not shown).

The main rotor develops a magnetic field, so that rotation of the main rotor relative to the main stator causes an AC output to be generated in the main stator windings.

The main rotor is magnetised by passing a DC current through the rotor windings. This DC current is generated by an exciter 6, which comprises exciter rotor 7, exciter stator 8, and rotating diodes 9. The exciter rotor 7 is mounted on the shaft 5, and rotation of the exciter rotor 7 relative to the exciter stator 8 generates an AC output in the exciter rotor windings. This AC output is converted to DC by the rotating diodes 9, and the DC output of the rotating diodes is fed to the main rotor 3.

In the arrangement of FIG. 1, power for the exciter 6 is drawn from the main stator 4, via an AVR 10. This is referred to as a self excitation. The AVR 10 controls the level of excitation supplied to the exciter stator 8. By controlling the relatively low power which is fed to the exciter stator, control of the high power in the main rotor is achieved through the rectified output of the exciter rotor.

Figure 2:
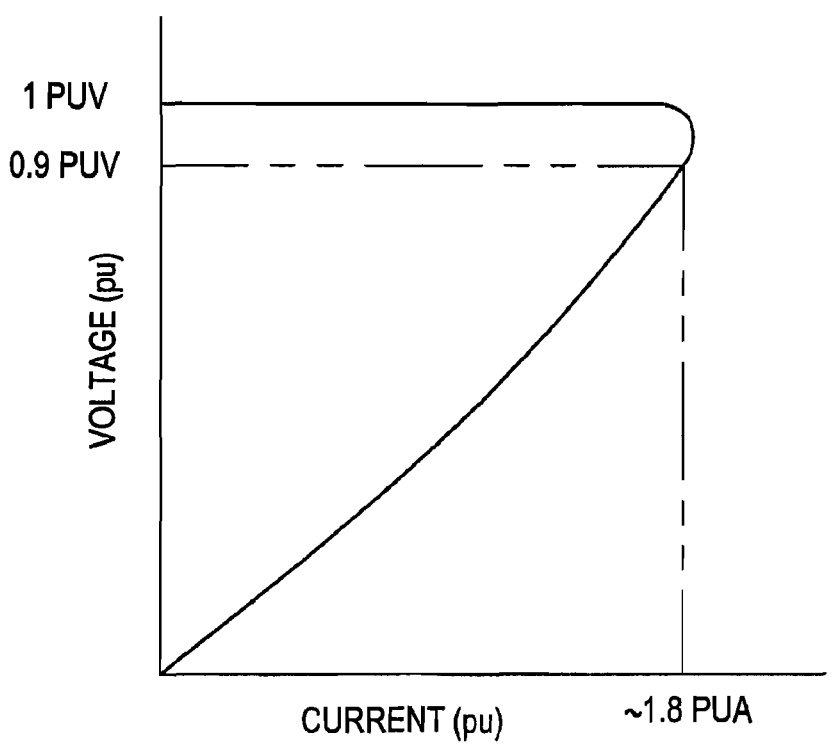
FIG. 2 shows the overload characteristics of a typical generator.

FIG. 2 shows the overload characteristics of a typical generator of the type shown in FIG. 1. Of note is the fact that the generator has no short circuit capability, i.e. at zero per unit volts, the generator produces zero per unit current. Overload capability is poor, with the generator achieving only ~1.8 per unit current at 90% rated voltage.

Figure 3:
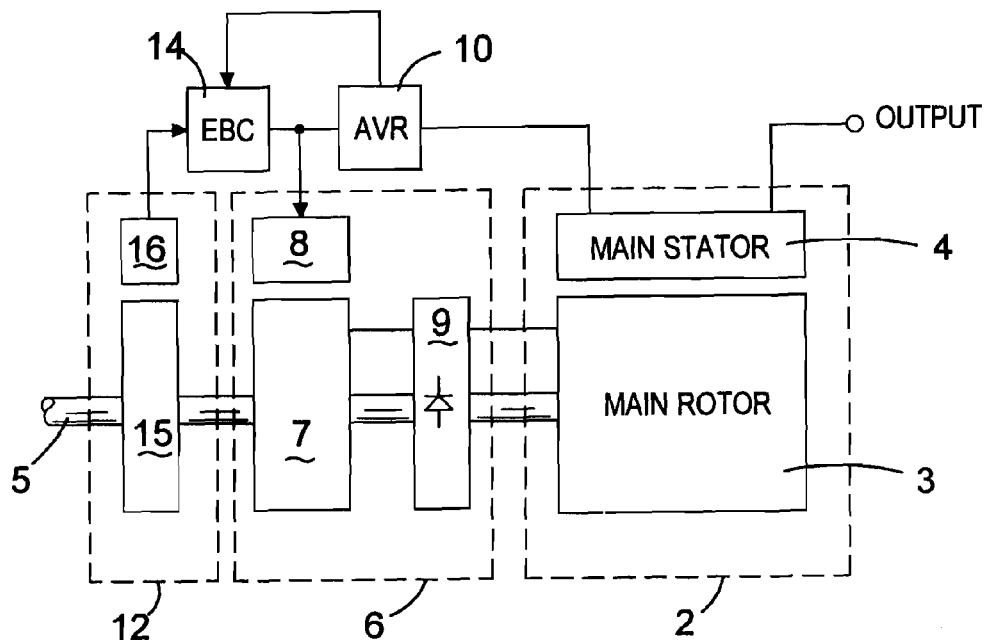
FIG. 3 shows parts of a synchronous generator with an excitation boost system.

FIG. 3 shows parts of a synchronous generator with an excitation boost system according to an embodiment of the invention. The excitation boost system consists of an excitation boost generator 12 and excitation boost controller 14. In this embodiment, the excitation boost generator 12 is a permanent magnet generator (PMG) having a rotor 15 and stator 16.

In the arrangement of FIG. 3, the AVR 10 manages power flow from the main stator 4 to the exciter field. For steady state operating conditions, i.e. no load through to full load operation, the excitation requirements are met primarily by the main machine power supply. During an overload event, additional power is provided to the exciter 6 from the excitation boost generator 12 to supplement that provided by the main machine.

Figure 4:
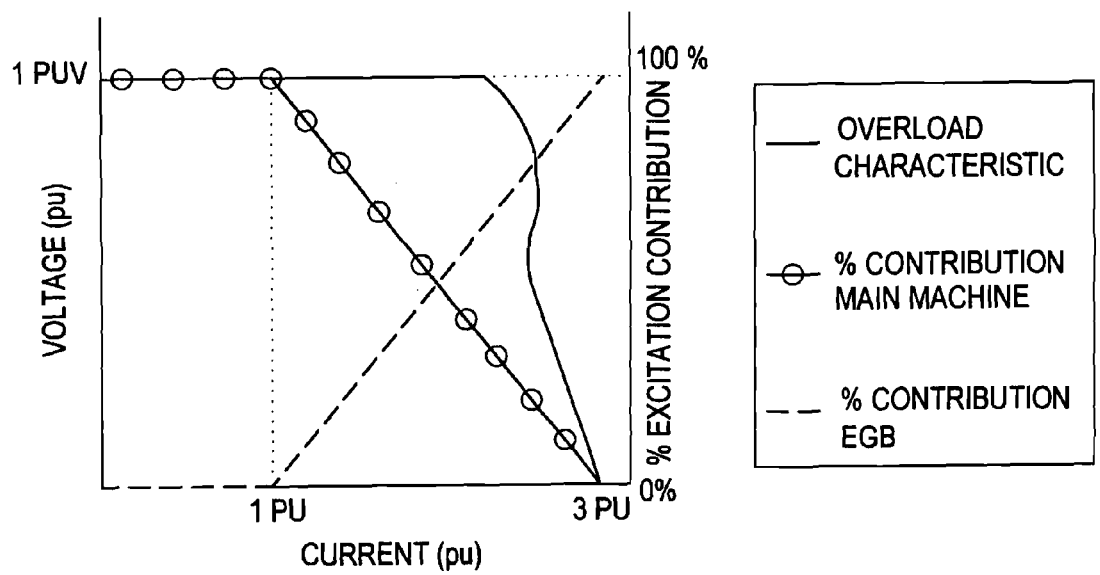
FIG. 4 shows possible voltage overload characteristics for the arrangement of FIG. 3.

The excitation boost controller 14 controls and manages power flow from the excitation boost generator 12. The percentage of excitation power met by the excitation boost generator versus that provided by the main machine varies between no load and short circuit for the main machine. During a short circuit condition, the excitation boost generator will contribute a majority (if not all) of the power required for the exciter field. FIG. 4 shows possible voltage overload characteristics for the arrangement of FIG. 3. In FIG. 4, an idealized contribution of each power source to the overall excitation requirement is illustrated.

The excitation boost generator 12 differs from a conventional permanent magnet generator in that it can be rated transiently rather than continuously, as it needs to operate only when excitation support is called upon by the excitation boost controller for short periods of time. This results in cost, weight, inertia and volumetric envelope benefits. For a small machine, the PMG may be, for example, of a 10 pole design, and may deliver, for example, 475 Watts of transient power into a 22Ω exciter field resistance to meet the short circuit requirement for the main generator (3×PU). It will of course be appreciated that values other than these may used as appropriate. The excitation boost generator may be up-fitted onto the shaft of the generator either post manufacture or in service.

In the present embodiment the excitation boost controller is an electronic module, separate to that of the AVR, that can be up-fit together with the excitation boost generator either post manufacture or in service. This can permit the use of a common AVR for use with generators either with or without excitation support. As discussed above, the function of the excitation boost controller is to control and manage the power flow from the excitation boost generator to the exciter field in order to supplement the power available from the main machine armature windings.

In an alternative embodiment, the excitation boost system may be implemented as part of an AVR.

Figure 5:
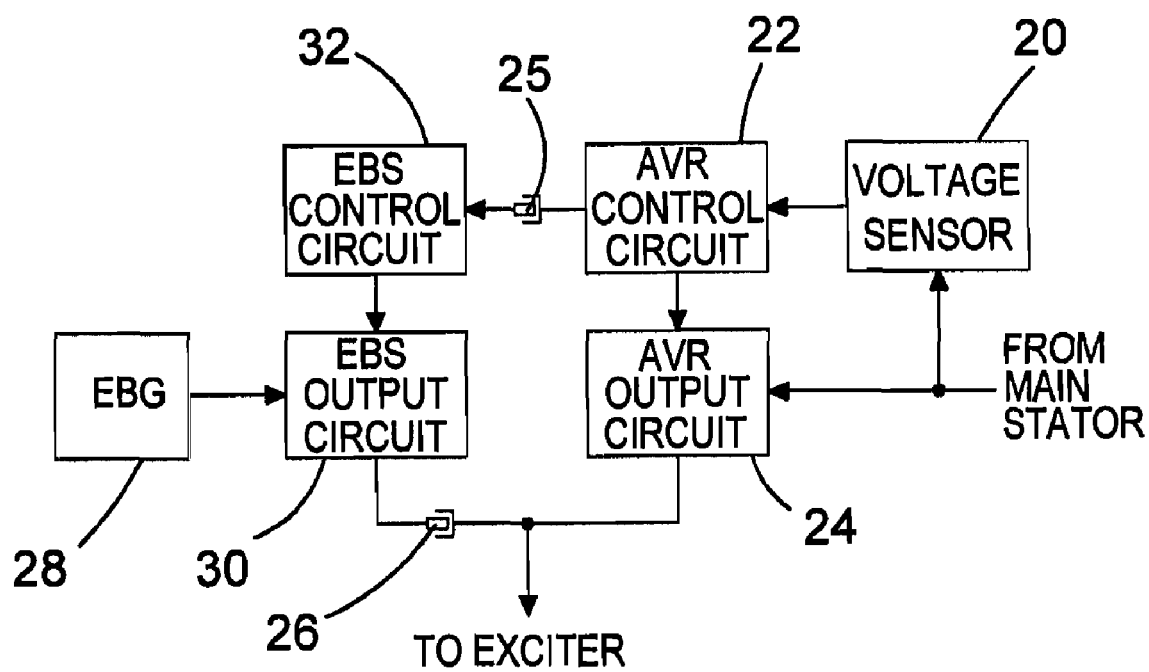
FIG. 5 shows in more detail parts of an excitation boost system.

FIG. 5 shows in more detail parts of an excitation boost system according to an embodiment of the invention. Referring to FIG. 5, an AC output from the generator main stator is sensed by voltage sensor 20. The sensed voltage is fed to AVR control circuit 22, which compares the sensed voltage with a reference voltage, in order to produce a control signal. The control signal is fed to AVR output circuit 24. The AVR output circuit 24 rectifies and controls the AC output from the main stator in accordance with the control signal, in order to produce a DC output for the exciter stator. The AVR output circuit 24 may comprise, for example, a thyristor connected in series between the main stator and exciter, which thyristor is controlled by the control circuit 22.

The voltage sensor 20, AVR control circuit 22 and AVR output circuit 24 are used to manage power flow from the main stator to the exciter during steady state operation. These components are therefore present in a machine which does not have enhanced overload capability. If it is desired to upgrade the machine to have enhanced overload capability, then an excitation boost system is connected to the machine by means of connectors 25, 26.

The excitation boost system (EBS) comprises an excitation boost generator 28, an EBS output circuit 30, and an EBS control circuit 32. When excitation boost is required, power is fed from the excitation boost generator 28 to the exciter by the EBS output circuit 30, under control of the EBS control circuit 32. The EBS control circuit 32 receives a control signal from the AVR control circuit 22 indicating the load condition of main machine. As the load on the main machine approaches and exceeds the rated load, power is fed from the excitation boost generator to the exciter to supplement or to replace the power from the main stator. As an example, the ratio of power from the excitation boost generator and power from the main stator may be as shown in FIG. 4.

The excitation boost generator 28 may be a permanent magnet generator mounted on the main shaft in the way shown in FIG. 3. The EBS output circuit 30 may then include means for rectifying as well as controlling the AC output from the permanent magnet generator.

Figure 6:
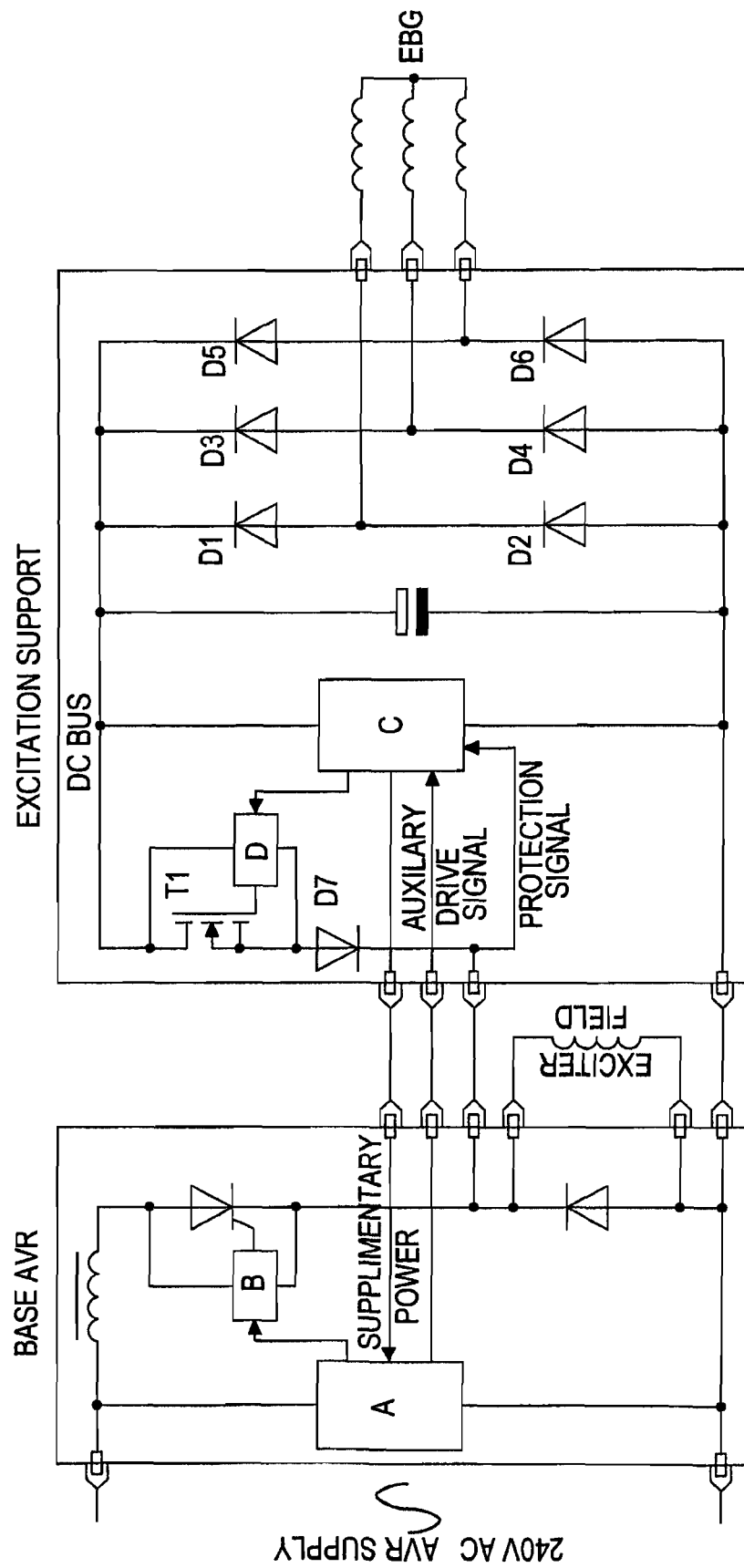
FIG. 6 shows an implementation of an excitation boost controller employing MOSFET switching technology.

FIG. 6 shows an implementation of the excitation boost controller employing MOSFET switching technology. Referring to FIG. 6, power from the excitation boost generator (EBG) is rectified by diodes D1-D6 to create a DC power bus. Power from the DC bus is fed to the exciter by the MOSET transistor T1 under control of the control circuit C and transistor drive circuit D. The control circuit C and drive circuit D use pulse-width-modulation (PWM) techniques to add exciter field current as necessary. The control circuit C determines the level of contribution necessary by monitoring the state of a control signal (Auxiliary Drive Signal) from the AVR. The PWM control ensures smooth transition of the AVR and excitation boost controller power sources.

Figure 7:
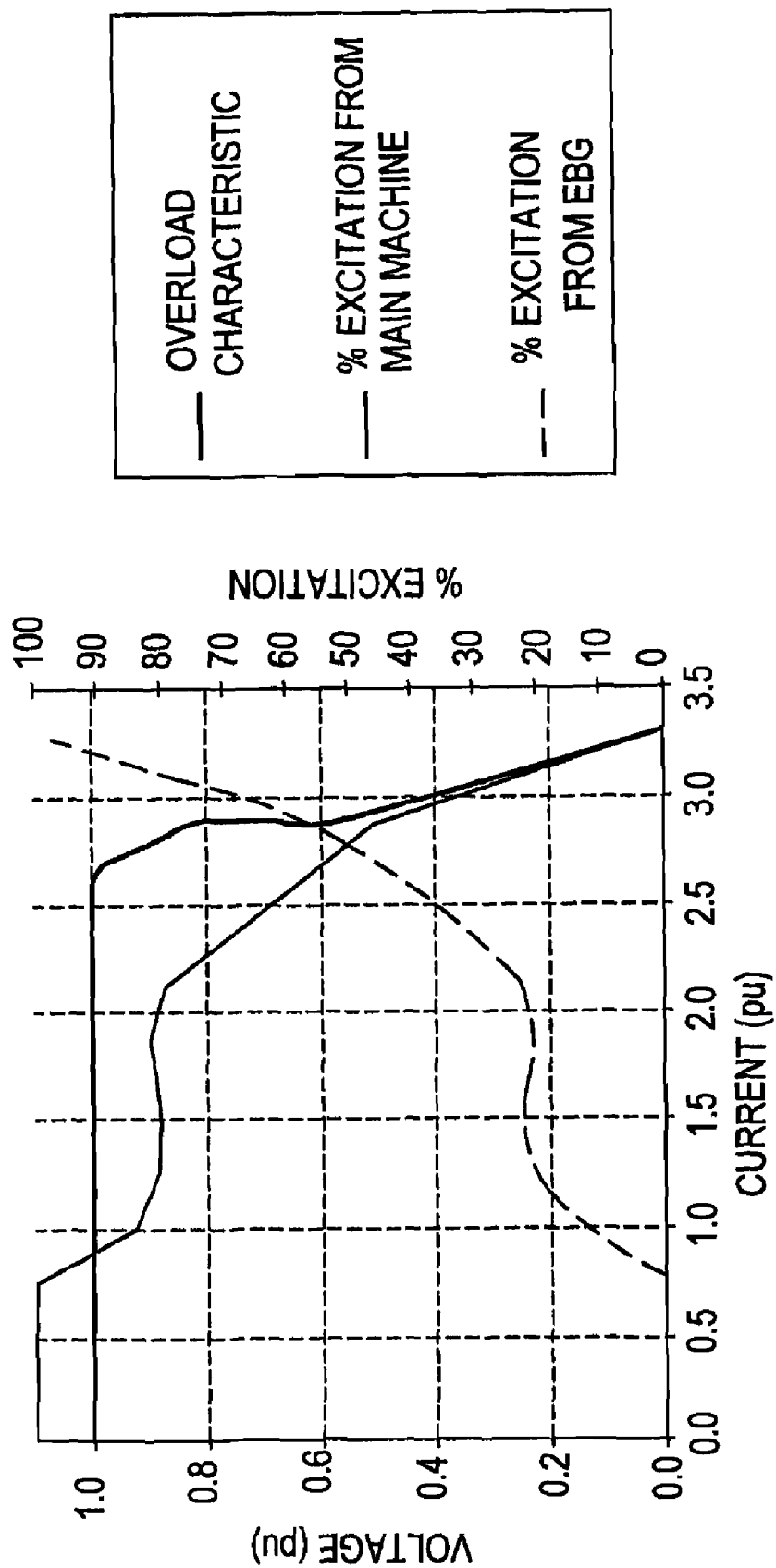
FIG. 7 shows the voltage overload characteristics of the arrangement of FIG. 6.

FIG. 7 shows the voltage overload characteristic achieved with an excitation boost controller of the type shown in FIG. 6, together with the percentage contribution to overall excitation requirements attributed to the main machine and the excitation boost controller. It can be see that, under normal operating conditions up to full load the excitation requirements are fulfilled mainly or entirely by the main machine. Under overload conditions the excitation requirements are fulfilled increasingly by the excitation boost generator, until under short circuit conditions all of the excitation power is provided by the excitation boost generator.

Figure 8:
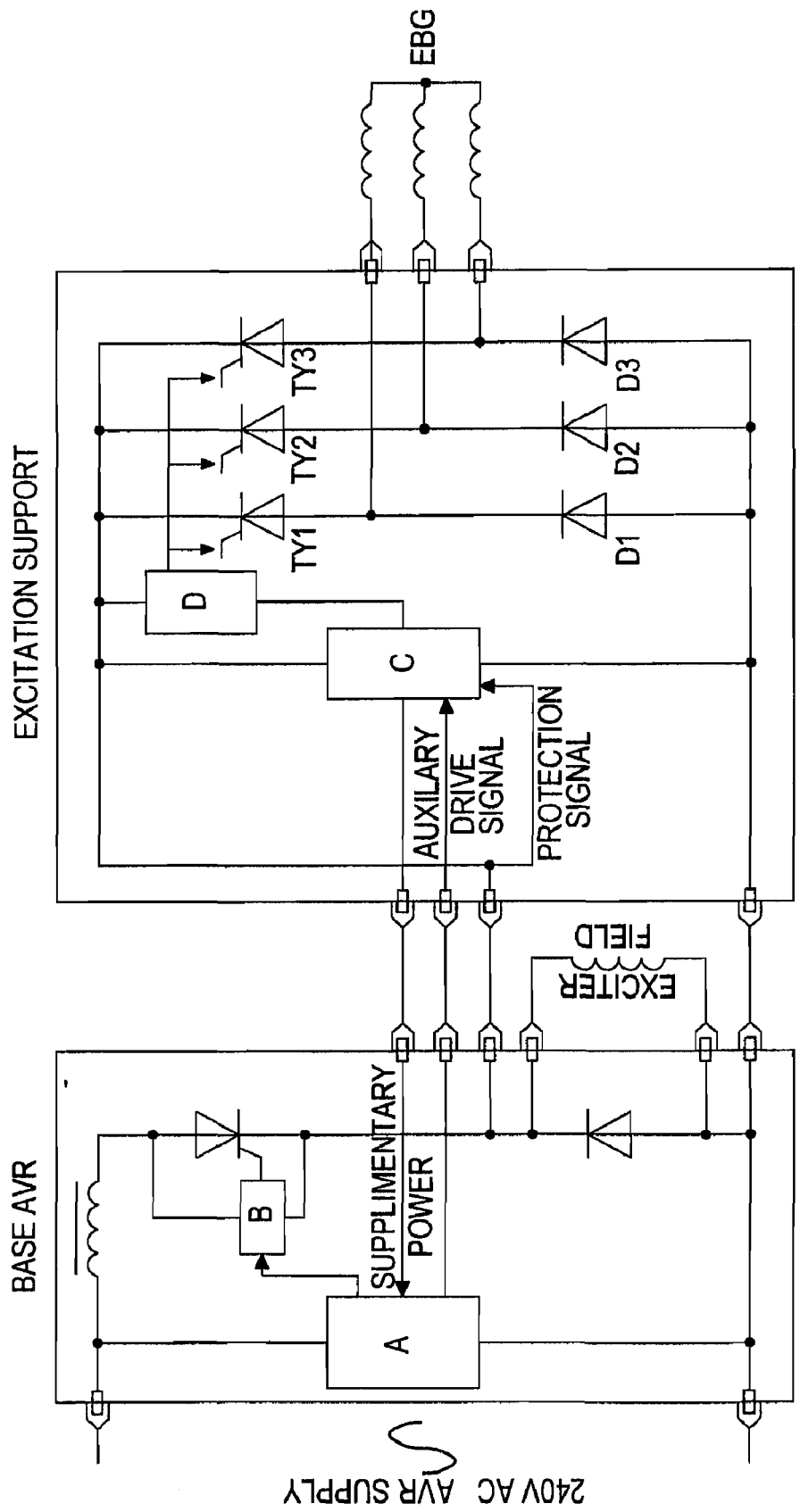
FIG. 8 shows an implementation of an excitation boost controller employing thyristor switching technology.

FIG. 8 shows an implementation of the excitation boost controller employing thyristor switching technology. Referring to FIG. 8, power from the excitation boost generator (EBG) is controlled into the exciter field via a half controlled, three phase thyristor bridge consisting of thyristors TY1, TY2 and TY3 and diodes D1, D2 and D3. The thyristors are driven by thyristor drive circuit D under control of control circuit C. The bridge is controlled in three simple steps up to full conduction again dependent upon a control signal (Auxiliary Drive Signal) from the AVR. Any inherent instability in this system is countered by the high-speed action of the AVR/excitation boost controller combination and the time constant of the exciter field and main machine. The overload characteristic achieved with this controller is illustrated in FIG. 9, together with the percentage contribution to overall excitation requirements attributed to the main machine and excitation boost controller.

Figure 9:
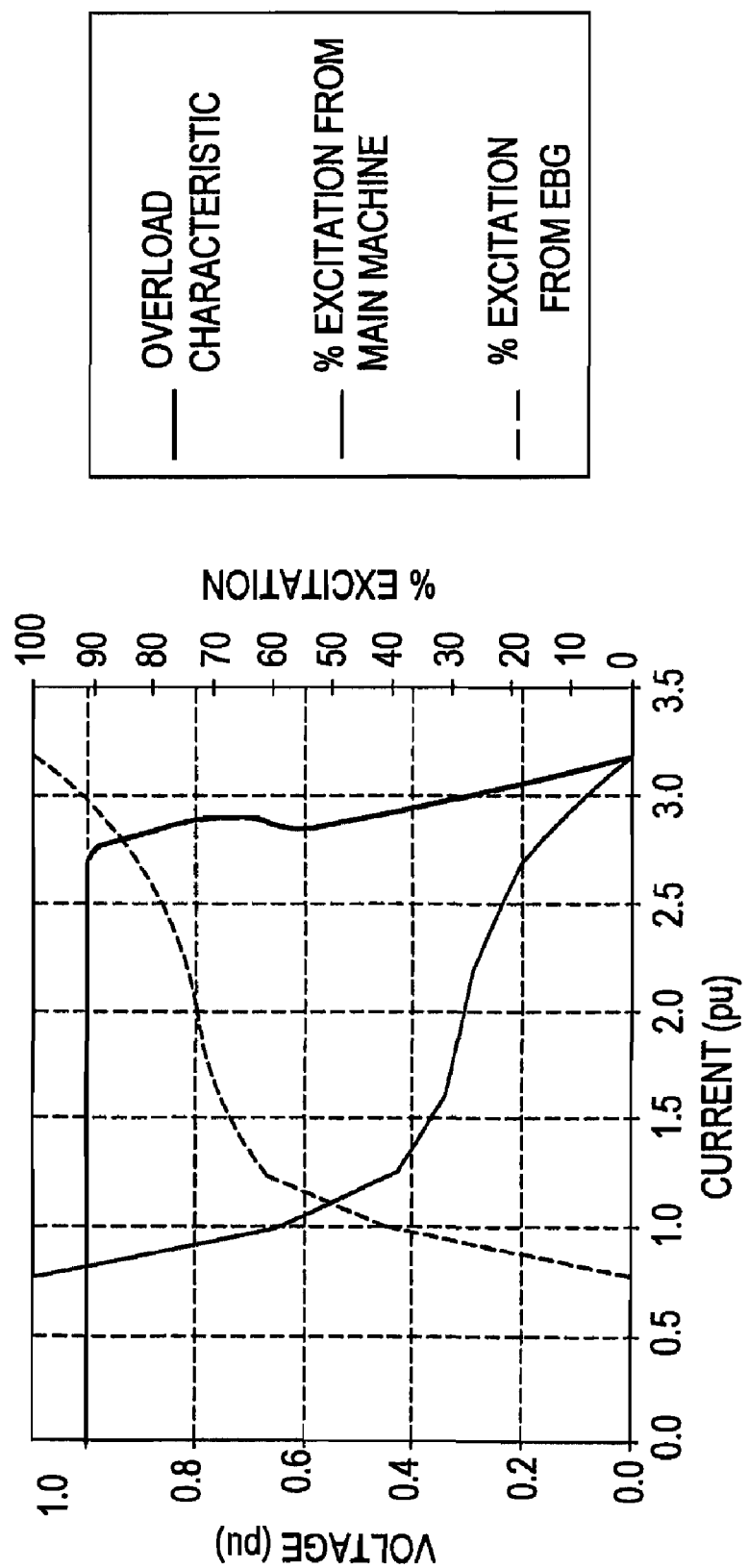
FIG. 9 shows the voltage overload characteristics of the arrangement of FIG. 8.

FIGS. 7 and 9 both show a short circuit capability of ~3 PU being achieved. Furthermore, at 90% generator volts an overload current of ~2.75 pu is possible; this being sufficient for example to start an induction motor of greater BP output per kVA of generator rating than that of a generator without means for providing overload support.

The short circuit and overload characteristics can of course be tailored to meet alternative requirements through altering the characteristics of the excitation boost system and the exciter field winding for a given main machine configuration.

FIGS. 5, 6 and 8 show a number of connections between the excitation boost system and the existing components of the generator. The excitation boost system of the present embodiment uses a "plug and play" wiring philosophy, in which all connections have push-fit connectors whilst no two of any of the connections are the same. This makes it impossible for incorrect connections to take place and thus simplifies the upgrading process.

The excitation boost system discussed above provides a means for supplementing power flow from one source, controlled by the AVR, with another. The AVR controlled excitation source may be the main machine, or some other source such as a permanent magnet generator mounted on the main shaft. The excitation boost generator may be a permanent magnet generator as discussed above, or some other source of power. While the embodiments discussed above use a three phase AC permanent magnet generator as the excitation boost power source, this of course could be a single phase AC power source if the 6 device rectifier on the input of the excitation boost controller were replaced with a single phase equivalent with 4 diodes.

FIG. 10 shows another embodiment of the excitation boost system. In the embodiment of FIG. 10 a DC source is used as the excitation boost generator. The DC source may be, for example, a conventional generator set battery which is charged by the generator during normal operation. The excitation boost controller is similar to that shown in FIG. 6 but without the rectifier. A DC/DC converter is used if the DC output from the source requires further conditioning and/or stabilizing to meet the requirements of the excitation boost controller. This might be the case if a low voltage (12/24 volts) generator set battery were used as the source of the DC power. Advantages afforded to achieving this advanced level of generator set integration include a smaller overall package as a result of the reduction in generator length that results.

Another example of a DC source that could be used as an alternative to the excitation boost generator is a super capacitor. In this case the capacitor is charged by the generator during normal operation, and provides a short term supply of power for the exciter during overload conditions.

The invention claimed is:

1. Excitation control circuitry for a synchronous generator, the synchronous generator comprising a main machine and an exciter for exciting the main machine, the excitation control circuitry comprising:
    an automatic voltage regulator for controlling power flow from the main machine to the exciter; and
    an excitation boost system for selectively supplying power from a second source of electrical power to the exciter, wherein the excitation boost system is arranged to receive a control signal from the automatic voltage regulator indicating a load condition of the generator, and to control the amount of power supplied from the second source of electrical power to the exciter in dependence on the control signal.

2. Excitation control circuitry according to claim 1, wherein the excitation boost system is arranged to supply power to the exciter from the second source of electrical power to supplement or to replace that supplied by the main machine during overload.

3. Excitation control circuitry according to claim 1, wherein the automatic voltage regulator is arranged to control power flow from the main machine to the exciter during steady state operation.

4. Excitation control circuitry according claim 1, wherein the excitation boost system is arranged to supply an increasing amount of power to the exciter from the second source of electrical power as the load on the generator increases during overload conditions.

5. Excitation control circuitry according to claim 1, wherein the excitation boost system is connectable to and removable from the automatic voltage regulator.

6. Excitation control circuitry according to claim 1, wherein the output of the automatic voltage regulator and the output of the excitation boost system are combined and supplied to the same exciter windings.

7. Excitation control circuitry according to claim 1, wherein the exciter is a single machine driven by the same prime mover as the main machine.

8. Excitation control circuitry according to claim 1, wherein the second source of electrical power is a machine which is driven by the same prime mover as the main machine.

9. Excitation control circuitry according to claim 1, wherein the second source of electrical power is a machine which is driven by a separate prime mover from that which drives the main machine.

10. Excitation control circuitry according to claim 1, wherein the second source of electrical power is a permanent magnet generator.

11. Excitation control circuitry according to claim 1, wherein the second source of electrical power is a DC power source.

12. Excitation control circuitry according to claim 1, wherein the second source of electrical power is a capacitor.

13. A synchronous generator comprising a main machine, an exciter for exciting the main machine, and excitation control circuitry according claim 1.

14. A method of exciting a synchronous generator, the synchronous generator comprising a main machine and an exciter for exciting the main machine, the method comprising:
    controlling power flow from the main machine to the exciter with an automatic voltage regulator; and
    selectively applying power to the exciter from a second source of electrical power with an excitation boost system;
    wherein the excitation boost system receives a control signal from the automatic voltage regulator indicating a load condition of the generator, and controls the amount of power supplied from the second source of electrical power to the exciter in dependence on the control signal.

* * * * *